United States Patent
Tanaka et al.

(10) Patent No.: US 8,233,627 B2
(45) Date of Patent: *Jul. 31, 2012

(54) METHOD AND SYSTEM FOR MANAGING A KEY FOR ENCRYPTION OR DECRYPTION OF DATA

(75) Inventors: Tomonari Tanaka, Tokyo (JP); Kazunori Sekido, Kunitachi (JP); Masamichi Tateoka, Higashimurayama (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1090 days.

This patent is subject to a terminal disclaimer.

(21) Appl. No.: 12/061,710

(22) Filed: Apr. 3, 2008

(65) Prior Publication Data

US 2009/0041249 A1 Feb. 12, 2009

(30) Foreign Application Priority Data

Apr. 9, 2007 (JP) ................................. 2007-102100

(51) Int. Cl.
*H04L 9/00* (2006.01)
(52) U.S. Cl. ........ 380/277; 380/278; 380/273; 380/279; 380/285; 380/286; 713/189; 713/150; 713/165; 713/176; 713/171; 713/194; 713/168; 348/E7.056; 348/E7.01; 726/26; 726/27; 705/71

(58) Field of Classification Search .................... 380/277
See application file for complete search history.

(56) References Cited

U.S. PATENT DOCUMENTS

| | | | | |
|---|---|---|---|---|
| 6,577,734 | B1 * | 6/2003 | Etzel et al. | 380/277 |
| 7,873,168 | B2 * | 1/2011 | Tateoka et al. | 380/282 |
| 2004/0039925 | A1 * | 2/2004 | McMillan et al. | 713/189 |
| 2006/0294378 | A1 * | 12/2006 | Lumsden et al. | 713/171 |

FOREIGN PATENT DOCUMENTS

| | | |
|---|---|---|
| JP | 10-198272 | 7/1998 |
| JP | 11-15373 | 1/1999 |

* cited by examiner

*Primary Examiner* — Syed A. Zia
*Assistant Examiner* — Bryan Wright
(74) *Attorney, Agent, or Firm* — Finnegan, Henderson, Farabow, Garrett & Dunner, L.L.P.

(57) ABSTRACT

A user private key is stored in a database of the user terminal. A user public key and user information are stored in the user management DB. The encryption/decryption unit encrypts an authority private key specific to a first authority given to a user, by using a user public key associated with user information to indicate a user. The secret sharing unit shares in secret an authority private key into two or more shared authority private keys. The encryption/decryption unit encrypts the shared authority private keys, by using an authority public key specific to each of second authorities to manage the first authority in a shared manner. The authority management DB stores the encrypted authority private key and authority public key in association with the first authority, and stores the encrypted shared authority private keys in association with the second authorities.

8 Claims, 10 Drawing Sheets

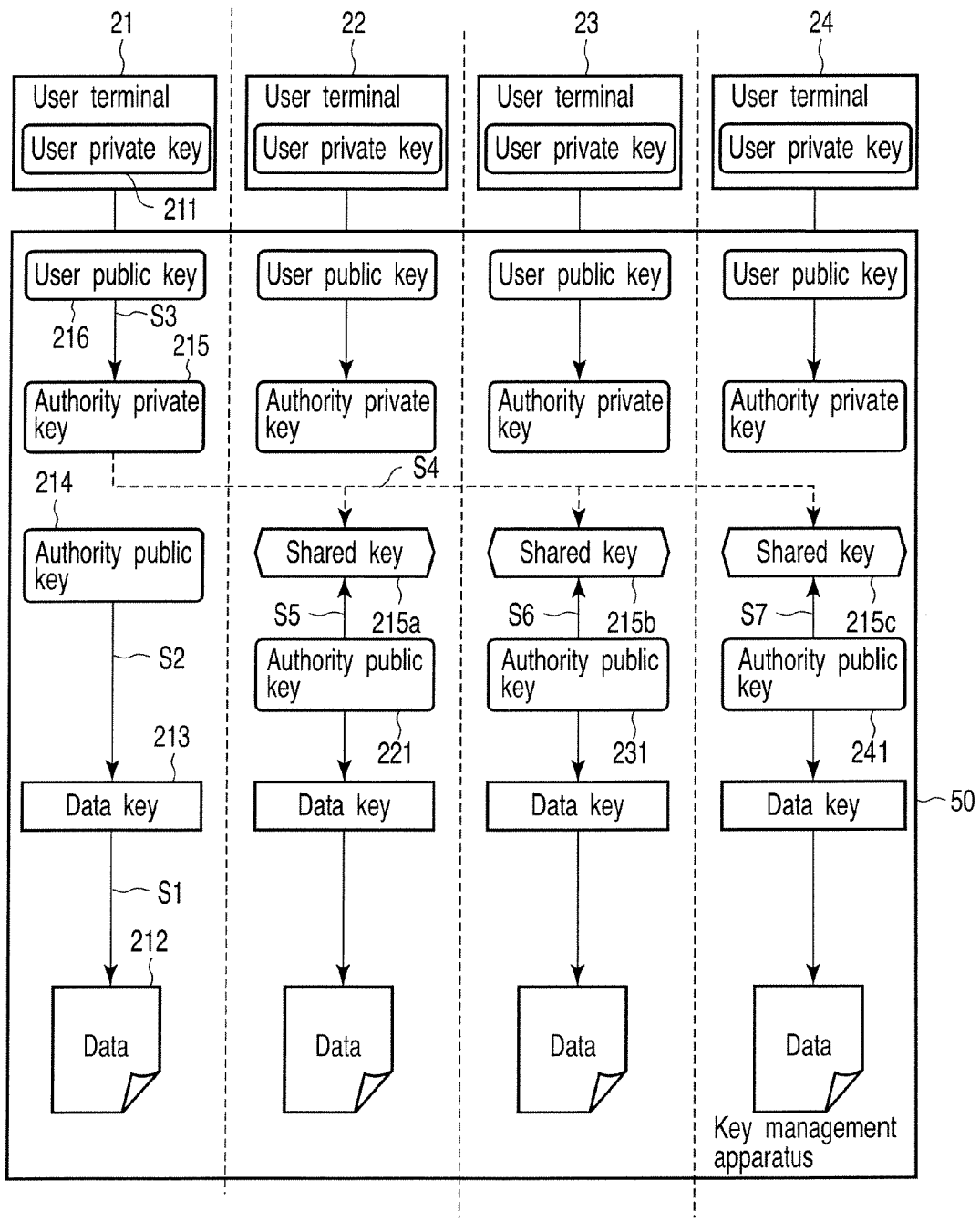
F I G. 1

| | User ID | Terminal address | User name |
|---|---|---|---|
| 511 | 1 | 172.29.0.1 | A |
| 512 | 2 | 172.29.0.2 | B |
| 513 | 3 | 172.29.0.3 | C |
| 514 | 4 | 172.29.0.4 | D |
| 515 | 5 | 172.29.0.5 | E |
| | ⋮ | ⋮ | ⋮ |

FIG. 3

| Authority ID | Authority name | Authority public key ID |
|---|---|---|
| 1 | Genera manager | 17 |
| 2 | Project C | 20 |
| ⋮ | ⋮ | ⋮ |

FIG. 4A

| Authority ID | User ID | Encrypted authority private key ID |
|---|---|---|
| 1 | 10 | 17 |
| 2 | 18 | 21 |
| 2 | 7 | 22 |
| 2 | 10 | 23 |
| ⋮ | ⋮ | ⋮ |

FIG. 4B

| Authority ID | Shared authority ID | Encrypted shared key ID |
|---|---|---|
| 1 | 8 | 1 |
| 1 | 17 | 2 |
| 1 | 9 | 4 |
| 2 | 7 | 5 |
| 2 | 4 | 6 |
| 2 | 3 | 3 |
| ⋮ | ⋮ | ⋮ |

FIG. 4C

| | Data ID | File name | Decrypted authority ID | Encrypted data key ID |
|---|---|---|---|---|
| 531 | 1 | Filename.txt | 10 | 1 |
| 532 | 2 | Name.txt | 21 | 2 |
| 533 | 3 | File.txt | 7 | 3 |
| 534 | 4 | File 2.txt | 10 | 4 |
| 535 | 5 | File 5.txt | 19 | 5 |
| | ⋮ | ⋮ | ⋮ | ⋮ |

FIG. 5

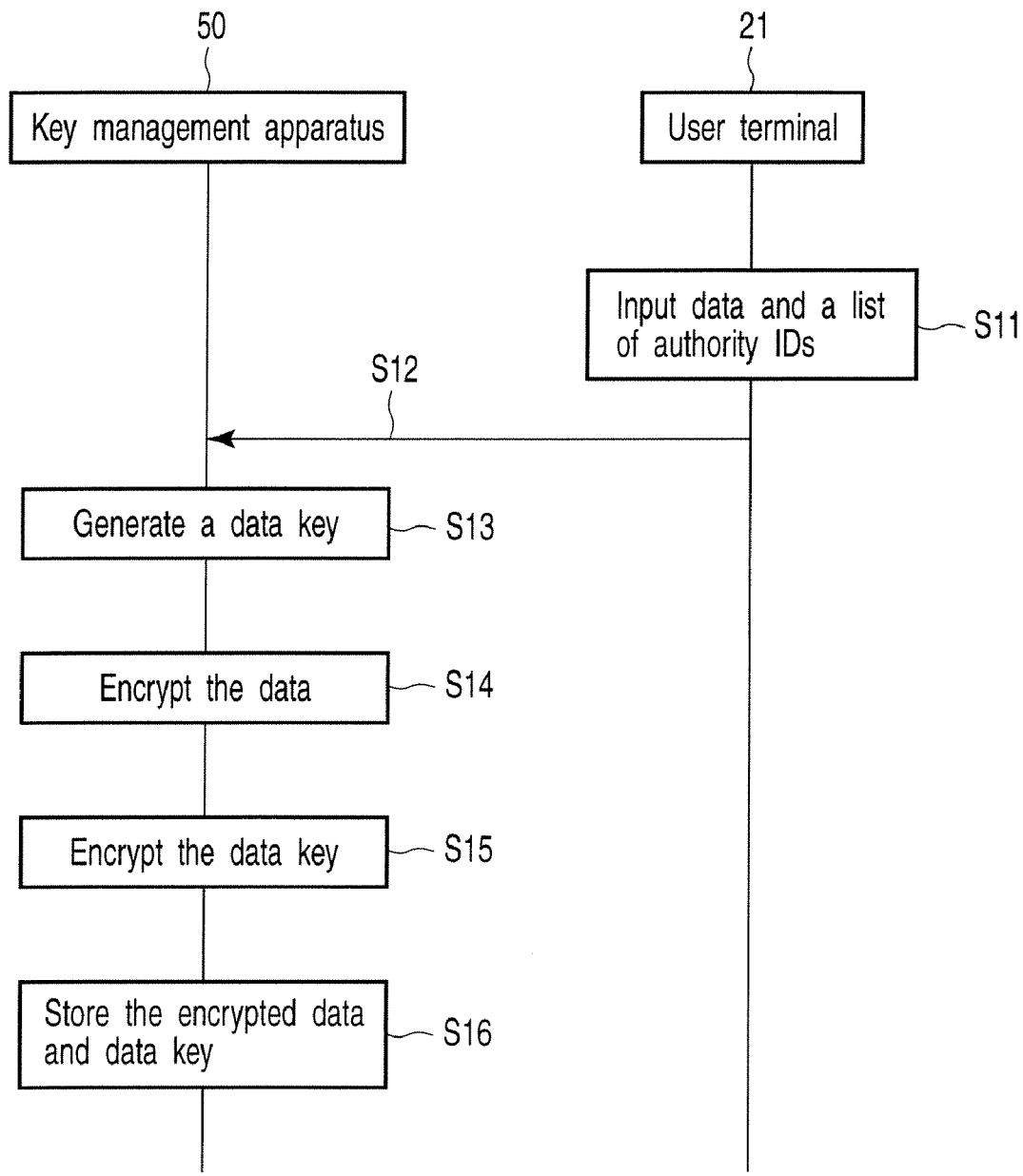
F I G. 6

METHOD AND SYSTEM FOR MANAGING A KEY FOR ENCRYPTION OR DECRYPTION OF DATA

CROSS-REFERENCE TO RELATED APPLICATIONS

This application is based upon and claims the benefit of priority from prior Japanese Patent Application No. 2007-102100, filed Apr. 9, 2007, the entire contents of which are incorporated herein by reference.

BACKGROUND OF THE INVENTION

1. Field of the Invention

The present invention relates to a key management system for managing a key for encryption or decryption of data.

2. Description of the Related Art

Recently, information equipment such as a personal computer has been daily used for business in an organization such as a company. For example, a file server is installed in such an organization. Therefore, clients (users) can access common folders and files set in a file server.

Data of such folders and files are saved (stored) in encrypted form by public-key cryptosystem, for example, to prevent leakage of information. Public-key cryptosystem uses a public key for encrypting plaintext (data) and a private key for decrypting the plaintext encrypted by using the public key.

Persons allowed to access data in a file server may be limited, depending on the data contents. This access right may be provided for each user, or may be provided for each authority of a user, such as a job title and post.

For example, when the access right is set for each authority of a user, a key (e.g., a public key, a private key, etc.) is managed for each user having authority given the access right. The user having the authority given the access right can use the access right by using the managed key.

A technique, which enables even a person other than an owner of key to obtain an original key by sharing a key itself in secret and collecting the necessary number of keys (part keys), has been disclosed as a key-managing method (hereinafter, mentioned as a Prior Art 1, refer to Jpn. Pat. Appln. KOKAI Publication No. 10-198272). According to the Prior Art 1, even if an owner of a key is absent, it is possible to obtain and use the key.

Another technique of managing a key has also been disclosed, in which public-key cryptosystem is not usable in an individual, but usable in a group consisting of a set of individuals, and encrypted data can be decrypted by a member belonging to a specific group (hereinafter, mentioned as a Prior Art 2, refer to Jpn. Pat. Appln. KOKAI Publication No. 11-15373). According to the Prior Art 2, it is easy to change members in a group.

A user who manages a key does not usually hold a fixed authority. A job title or post is sometimes changed in an organization. Therefore, the user's authority may be changed by organizational changes or personnel changes. When the validity of a key managed by the user expires, or a key is lost, the key must be changed (updated).

However, in the Prior Art 1, when a key is changed, it is necessary to change the part keys. In this case, each owner (user) who manages the part keys must change the part keys managed by them. When an owner of the part key is changed, it is difficult to take away the part key that is electronic data, from the owner. Therefore, it is not easy to change the authority of an owner.

In the Prior Art 2, members of a group can be easily changed by encrypting a group private key by a user's public key. There is no problem in handling data shared by two or more members. But, when data held by one user is handled, the data cannot be decrypted if the user loses a key.

BRIEF SUMMARY OF THE INVENTION

It is an object of the invention to provide a key management system and a key management method, which are configured to easily cope with cases where a key is changed or lost by organizational changes, personnel changes, or expiration of validity, in a system in which a key of data is managed by a user not to allow even a system administrator to decrypt data.

According to an aspect of the invention, there is provided a key management system comprising user terminals; and a key management apparatus connected to the user terminals, wherein each of the user terminals includes a first database to store a user private key specific to a user who uses the user terminal, the key management apparatus includes a second database to store a user public key paired with a user private key stored in the first data base, and user information to indicate a user who uses a user terminal including the first database, by associating them with each other; a first encryption unit which encrypts an authority private key specific to a first authority given to each of the users who use the user terminals by using a user public key stored in the second database in association with user information to indicate a user given the first authority; a secret sharing unit which shares in secret an authority private key specific to the first authority, into shared authority private keys; a second encryption unit which encrypts each of the shared authority private keys shared in secret by using an authority public key specific to each of second authorities different from the first authority; and a third database which stores an authority private key encrypted by the first encryption unit and an authority public key paired with the authority private key, in association with the first authority, and stores shared authority private keys encrypted by the second encryption unit, in association with the second authorities.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing the concept of key management in a key management system according to an embodiment of the invention;

FIG. 3 is a table showing an example of a data structure of user information stored in a user management database 51 shown in FIG. 1;

FIG. 4A is a table showing an example of a data structure of a first list included in a list of authorities stored in an authority management database 52 shown in FIG. 1;

FIG. 4B is a table showing an example of a data structure of a second list included in a list of authorities stored in the authority management database 52 shown in FIG. 1;

FIG. 4C is a table showing an example of a data structure of a third list included in the list of authorities stored in the authority management database 52 shown in FIG. 1;

FIG. 5 is a table showing an example of a data structure of data information stored in an authority management database 53 shown in FIG. 1;

FIG. 6 is a sequence chart showing procedural steps of a data storing process in the key management system;

DETAILED DESCRIPTION OF THE INVENTION

Figure 2:
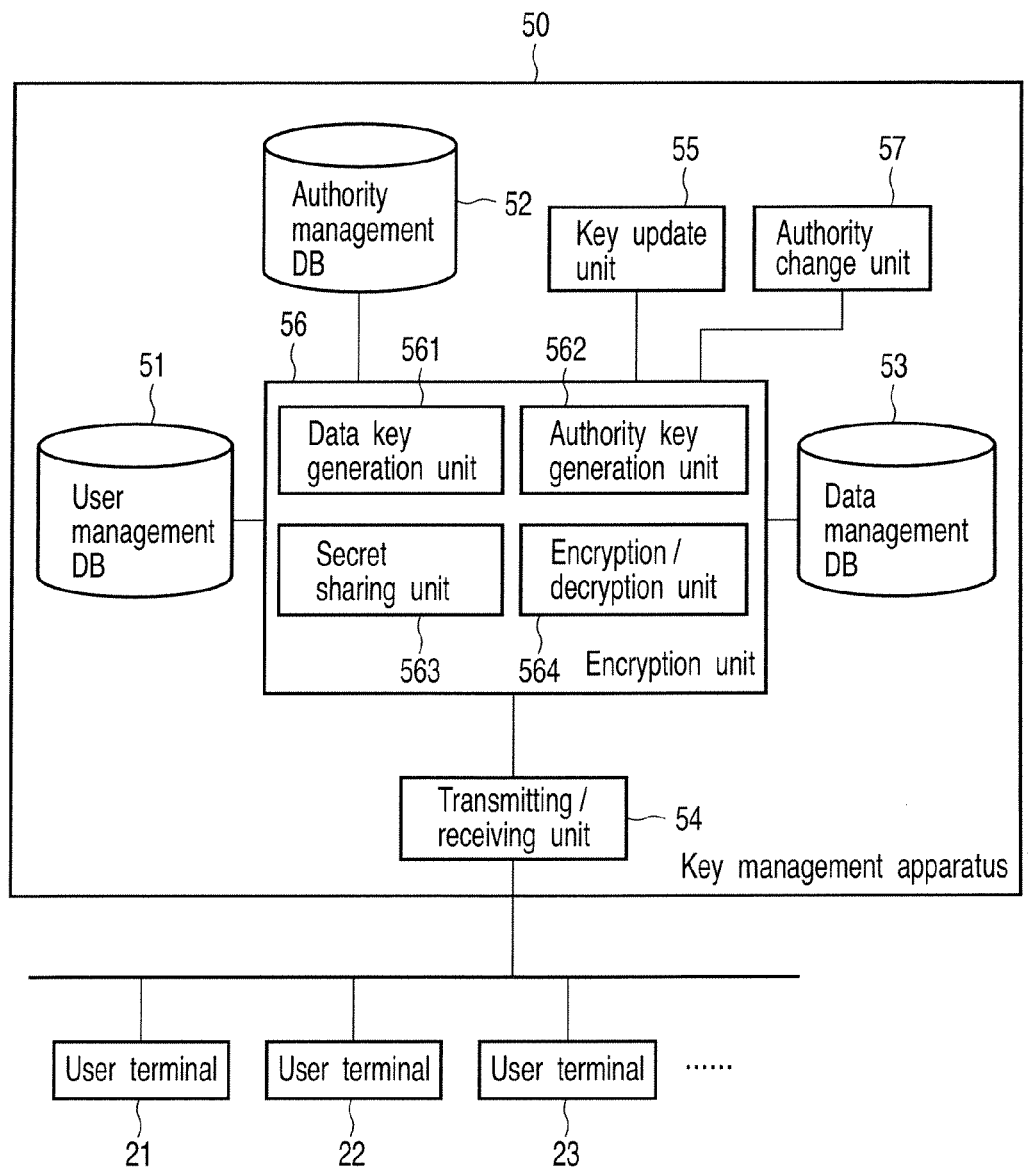
FIG. 2 is a block diagram showing main functional units of the key management system according to the embodiment.

An embodiment of the invention will be explained hereinafter with reference to the accompanying drawings.

FIG. 1 is a diagram showing the concept of key management in a key management system according to the embodiment. The key management system is used for management of data in a system, such as a file server in an organization (a company, etc.). The key management system comprises a key management apparatus 50, and user terminals. As shown in FIG. 1, the user terminals include user terminals 21-24.

The key management system shown in FIG. 1 uses a user private key and user public key specific to each user of the users who use (operate) the user terminals, an authority private key and authority public key given to each user, and a data key for encrypting data or decrypting the encrypted data. A user public key, user private key, authority public key, and authority private key are keys used in public-key cryptosystem. A data key is a key used in common-key encryptosystem.

Authority includes a job post (e.g., a general manager) in an organization such as a company using a key management system. Authority is given to at least one user among those who use user terminals. One authority may be given to two or more users. A user can decrypt (view) specific data set for the authority given to the user based on that authority. In addition to data decryption, an electronic signature can be performed by using a given authority. Two or more authorities may be given to one user.

The user terminals 21-24 have the same configuration. Hereinafter, an explanation will be given for the user terminal 21, for example. A user who uses the user terminal 21 is assumed as a user A. Users who use user terminals 22, 23 and 24 are assumed as users B, C and D, respectively.

In the user terminal 21, a user private key 211 specific to the user A (specific to the user terminal 21) is managed (stored). A personal computer (PC) is used as a user terminal 21, for example. An IC card having a computational function for decryption can be as a user terminal 21.

Data 212 managed by the key management apparatus 50 is encrypted by using a data key 213 (step S1) and encrypted data is stored. The data 212 can be viewed based on authority held by (given to) the user A, for example.

The data key 213 used for encryption of the data 212 is encrypted by using an authority public key 214 (step S2) and encrypted key is stored. This authority public key 214 is an authority public key specific to authority (e.g., a general manager) given to the user A. The authority public key 214 is stored in the key management apparatus 50, without being encrypted.

An authority private key 215 paired with the authority public key 214 is encrypted by using a user public key 216 paired with the user private key 211 specific to the user A (step S3) and encrypted key is stored. As being paired with the authority public key 214, the authority private key 215 is an authority private key specific to the authority given to the user A.

The authority private key 215 is shared in secret (step S4). As a result, shared authority private keys (hereinafter, referred to as shared keys) 215a, 215b, and 215c are obtained. It is possible to obtain the authority private key 215 from a predetermined number of shared keys (two, for example).

Users given two or more (three, here) authorities (second authorities) to manage the authority (first authority) given to the user A in a shared manner are assumed here as users B, C and D. The second authorities to manage the first authority given to the user A in a shared manner are different to one another. Each of the second authorities to manage the first authority given to the user A in a shared manner is different from the first authority given to the user A.

The shared key 215a is encrypted by using an authority public key 221 specific to one authority (authority given to the user B to use the terminal 22) among the authorities to manage the authority given to the user A in a shared manner (step 5) and encrypted key is stored. The shared key 215b is encrypted by using an authority public key 231 specific to one authority (authority given to the user C to use the terminal 23) among the authorities to manage the authority given to the user A in a shared manner (step S6) and encrypted key is stored. Similarly, the shared key 215c is encrypted by using an authority public key 241 specific to one authority (authority given to the user D to use the terminal 24) among the authorities to manage the authority given to the user A in a shared manner (step S7) and encrypted key is stored.

The user public key 216 is stored in the key management apparatus 50 without being encrypted.

The user terminal 21 has been explained above. In other user terminals (22-24), keys specific to the other user terminals are managed.

FIG. 2 is a block diagram showing main functional units of the key management system according to the embodiment. As shown in FIG. 2, the key management system comprises a key management apparatus 50, and user terminals.

The user terminals include the user terminals 21, 22 and 23. The user terminals 21, 22, and 23 are connected to be capable of communicating with the key management apparatus 50 through a network such as a local area network (LAN). Hereinafter, the user terminals will be explained as the user terminal 21.

The user terminal 21 stores a user private key for public-key cryptosystem, for example, specific to a user who uses (operates) the user terminal 21. This user private key is stored in a database (a first database) included in the user terminal 21, and managed in secret. In FIG. 2, the first database included in each of the user terminals including the user terminal 21 is omitted.

The user terminal 21 sends the data specified by a user by operating the user terminal 21 and an authority ID (authority information) to identify authority to manage the data, to the key management apparatus 50 as a data-storing request. This authority includes a job post (e.g., a general manager) in an organization such as a company using a key management system, as described hereinbefore. A user who is given authority can view specific data associated with the authority.

The user terminal 21 also sends a user ID (user information) to identify a user who uses the user terminal 21, to the key management apparatus 50 as a data-decrypting request for the data managed by the key management apparatus 50.

Further, the user terminal 21 receives an encrypted authority private key (hereinafter, referred to as an encrypted authority private key) sent from the key management apparatus 50. This encrypted authority private key is encrypted by using a user public key paired with a user private key stored in the user terminal 21. The user terminal 21 decrypts the received encrypted authority private key, by using the user private key stored in the user terminal 21. The user terminal 21 sends the decrypted authority private key to the key management apparatus 50.

The user terminal 21 includes a user key generation unit (not shown). The user key generation unit generates a new user key (a user public key and a user private key) by using random numbers, when the user private key stored in the user terminal 21 is lost.

The key management apparatus 50 includes a user management database (DB) 51, an authority management database 52, a data management database 53, a transmitting/receiving unit 54, a key update unit 55, an encryption unit 56, and an authority change notification unit 57.

The user management database 51 stores user information to indicate users who use user terminals. The user information includes a user ID to indicate (identify) a user, a terminal address of a user terminal used by the user, and a user name of the user. The user management database 51 also stores a user public key paired with a user private key stored in each user terminal. A user public key is stored in association with the user information. Namely, in the user management database 51, a user public key is stored in correspondence with the user information.

The authority management database 52 stores a list of authorities, which indicates authority and authorities (configuration of authorities) which manage the authority in a shared manner. The list of authorities includes first to third lists, to be described later. The list of authorities includes a user ID, a shared authority ID (second authority information), an authority public key ID, an encrypted authority private key ID, and an encrypted shared key ID, in association with an authority ID (first authority information) to identify authority. The user ID identifies a user having (given) authority identified (indicated) by an authority ID. The shared authority ID identifies authority to manage the authority identified by the authority ID in a shared manner. The authority public key ID identifies an authority public key specific to the authority identified by the authority ID. The encrypted authority private key ID identifies an authority private key (encrypted authority private key) specific to the authority identified by the authority ID, which is encrypted by using a user public key specific to the user identified by the user ID. The encrypted shared key ID identifies a shared key (hereinafter, referred to as an encrypted shared key) shared in secret from an authority private key specific to the authority identified by the authority ID, which is encrypted by using an authority public key specific to the authority indicated by the shared authority ID.

The authority management database 52 stores an authority public key identified by an authority public key ID, in association with the authority public key ID. The authority management database 52 also stores an encrypted authority private key identified by an encrypted authority private key ID, in association with the encrypted authority private key ID.

Further, the authority management database 52 stores an encrypted shared key identified by an encrypted shared key ID, in association with the encrypted shared key ID.

As described above, an authority public key, an encrypted authority private key and an encrypted shared key are stored in correspondence to a list of authorities.

The data management database 53 stores data information about data to be managed in the key management system. The data information includes a data ID to identify encrypted data (hereinafter, referred to as encrypted data), a file name of the encrypted data, a decrypted authority ID to identify authority to decrypt and view the encrypted data, and an encrypted data key ID to identify a data key (hereinafter, referred to as an encrypted data key) encrypted by using an authority public key specific to the authority identified by the decrypted authority ID.

The data management database 53 also stores encrypted data identified by a data ID, in association with the data ID. Further, the data management database 53 stores an encrypted data key identified by an encrypted data key ID, in association with the encrypted data key ID, for example. Namely, the user management database 53 stores encrypted data and an encrypted data key, in correspondence with an authority ID included in the data information.

The transmitting/receiving unit 54 receives a data-storing request and data-decrypting request sent from the user terminal 21, or a decrypted authority private key, for example. The transmitting/receiving unit 54 transmits the received data-storing request, data-decrypting request, or decrypted authority private key, to the encryption unit 56.

The transmitting/receiving unit 54 also transmits an encrypted authority private key stored in the authority management database 52, to the user terminal 21, for example. The transmitting/receiving unit 54 transmits data decrypted in response to a data-decrypting request, to the user terminal 21, for example.

The key update unit 55 informs the encryption unit 56 of updating (changing) of an authority key (an authority public key and an authority private key) specified as requested by an administrator of the key management apparatus 50, for example.

The encryption unit 56 manages the information (data) stored in the user management database 51, authority management database 52 and data management database 53. The encryption unit 56 includes a data key generation unit 561, an authority key generation unit 562, a secret sharing unit 563, and an encryption/decryption unit 564.

The data key generation unit 561 generates a data key for encrypting data included in a data-storing request transmitted from the transmitting/receiving unit 54, or for decrypting the encrypted data. This data key is a common key as described above.

The authority key generation unit 562 generates a new authority public key and authority private key specific to a certain authority, when the key update unit 55 provides notification about updating of an authority public key and authority private key (authority keys) specific to the authority. The authority key generation unit 562 generates an authority public key and an authority private key, by using random numbers, for example.

The secret sharing unit 563 shares in secret an authority private key specific to a certain authority into shared keys. At this time, the secret sharing unit 563 shares an authority private key into shared keys of the same number as authorities to manage authority in a shared manner (shared authority IDs associated with an authority ID), for example. The secret sharing unit 563 synthesizes an authority private key from a predetermined number (two, for example) of shared keys.

The encryption/decryption unit 564 encrypts data included in a data-storing request transmitted from the transmitting/receiving unit 54, by using a data key generated by the data key generation unit 561. The encryption/decryption unit 564 encrypts the data key used for encryption of the data, by using an authority private key specific to the authority capable of viewing the data. This authority private key is stored in the authority management database 52. At this time, the encryption/decryption unit 564 executes encryption by referring to the authority ID included in the data-storing request, and the authority management database 52. The encryption/decryption unit 564 stores the encrypted data and encrypted data key in the data management database 53.

The encryption/decryption unit 564 encrypts an authority private key specific to the authority given to a user, by using a user public key specific to the user.

The encryption/decryption unit 564 executes encryption by referring to the user management database 51 and authority management database 52. The encryption/decryption unit 564 stores the encrypted authority private key in the authority management database 52.

The encryption/decryption unit 564 encrypts shared keys shared in secret by the secret sharing unit 563, by using an authority public key specific to each of authorities to manage the shared keys. The encryption/decryption unit 564 executes encryption by referring to the authority management database 52. The encryption/decryption unit 564 stores the encrypted shared keys in the authority management database 52.

The encryption/decryption unit 564 decrypts an encrypted data key stored in the data management database 53, by using an authority private key transmitted from the user terminal 21 through the transmitting/receiving unit 54. The encryption/decryption unit 564 decrypts encrypted data stored in the data management database 53, by using the decrypted data key. The decrypted data is sent to the user terminal 21 through the transmitting/receiving unit 54.

When an authority public key and authority private key managed in the key management system are changed (updated), the encryption/decryption unit 564 executes encryption or decryption according to the change. When a user public key and user private key specific to a user who uses the user terminal 21 are changed in the user terminal 21, the encryption/decryption unit 564 executes encryption or decryption according to the change. When a user given a certain authority is changed, the encryption/decryption unit 564 executes encryption or decryption according to the change. The details of a process to be executed when such a change occurs in a key or authority will be explained later.

The authority change notification unit 57 notifies the encryption unit 56 that the authority given to a user is changed, according to the operation of an administrator of the key management apparatus 50.

FIG. 3 shows an example of a data structure of user information stored in the user management database 51.

As shown in FIG. 3, user information includes a user ID to identify a user, a terminal address to specify a user terminal used by a user identified by the user ID, and a name of the user.

In the example shown in FIG. 3, user information 511 includes a user ID "1", a terminal address "172.29.0.1", and a user name "A". User information 512 includes a user ID "2", a terminal address "172.29.0.2", and a user name "B". User information 513 includes a user ID "3", a terminal address "172.29.0.3", and a user name "C". User information 514 includes a user ID "4", a terminal address "172.29.0.4", and a user name "D". User information 515 includes a user ID "5", a terminal address "172.29.0.5", and a user name "E".

FIG. 4A shows an example of a data structure of a first list included in the list of authorities described hereinbefore.

As shown in FIG. 4A, the first list includes an authority name and an authority public key ID, in association with an authority ID to identify authority. The authority public key ID identifies an authority public key specific to the authority identified by the authority ID.

In the example shown in FIG. 4A, the first list includes an authority name "general manager" and an authority public key ID "20", in association with an authority ID "1", for example. An authority name "project C" and an authority public key ID "20" are stored in association with an authority ID "2", for example.

FIG. 4B shows an example of a data structure of a second list included in the list of authorities described above.

As shown in FIG. 4B, the second list includes a user ID and an encrypted authority private key ID, in association with an authority ID. The user ID identifies a user who is given authority identified by an authority ID. The encrypted authority private key ID identifies an authority private key (i.e., an encrypted authority private key) specific to the authority identified by an authority ID, which is encrypted by using a user public key specific to a user having the authority identified by the authority ID.

In the example shown in FIG. 4B, the second list includes a user ID "10" and an encrypted authority private key ID "17", in association with the authority ID "1", for example. A user ID "18" and an encrypted authority private key ID "21" are stored in association with the authority ID "2". A user ID "7" and an encrypted authority private key ID "22" are stored in association with the authority ID "2". A user ID "10" and an encrypted authority private key ID "23" are stored in association with the authority ID "2".

As described above, one authority (here, the authority ID "2") may be given to two or more users (here, the user IDs "18", "7" and "10"). Further, like the user identified by the user ID "10", two or more authorities (here, the authority IDs "1" and "2") may be given to one user.

FIG. 4C shows an example of a data structure of a third list included in the list of authorities described above.

As shown in FIG. 4C, the third list includes a shared authority ID and an encrypted shared key ID, in association with an authority ID. The shared authority ID identifies the authority to manage the authority identified by the authority ID in a shared manner. The encrypted shared key ID identifies a shared key (i.e., an encrypted shared key) shared in secret from an authority private key specific to the authority identified by the authority ID, which is encrypted by using an authority public key specific to the authority indicated by the shared authority ID. Two or more authorities are set for one authority to manage that authority in a shared manner. The authorities set to manage one authority in a shared manner are different to one another.

In the example shown in FIG. 4C, the third list includes a shared authority ID "8" and an encrypted shared key ID "1", in association with the authority ID "1". A shared authority ID "17" and an encrypted shared key ID "2" are stored in association with the authority ID "1". A shared authority ID "9" and an encrypted shared key ID "4" are stored in association with the authority ID "1". A shared authority ID "7" and an encrypted shared key ID "5" are stored in association with the authority ID "2". A shared authority ID "7" and an encrypted shared key ID "5" are stored in association with the authority ID "2". A shared authority ID "3" and an encrypted shared key ID "3" are stored in association with the authority ID "2".

FIG. 5 shows an example of a data structure of data information stored in the data management database 53.

As shown in FIG. 5, data information includes a data ID to identify data, a file name of the data, an decrypted authority ID to decrypt the data, and an encrypted data key ID to identify an encrypted data key. A user having the authority identified by the decrypted authority ID can view the data identified by the data ID associated with the decrypted authority ID, for example. Two or more decrypted authority IDs may be set for one data ID.

In the example shown in FIG. 5, data information 531 includes a data ID "1", a file name "Filename.txt", a decrypted authority ID "10", and an encrypted data key ID "1". In this case, a user who can decrypt and view the data identified by the data ID "1" is a user who is given the authority identified by the decrypted authority ID "10".

Data information 532 includes a data ID "2", file name "Name.txt", a decrypted authority ID "21", and an encrypted data key ID "2". Data information 533 includes a data ID "3", file name "File.txt", a decrypted authority ID "7", and an encrypted data key ID "3". Data information 534 includes a data ID "4", file name "File2.txt", a decrypted authority ID "10", and an encrypted data key ID "4". Data information 535 includes a data ID "5", file name "File5.txt", a decrypted authority ID "19", and an encrypted data key ID "5".

Next, an explanation will be given on a data storing process in the key management system by referring to the sequence chart of FIG. 6.

First, among the user terminals included in the key management system, the user terminal 21 inputs the data and authority ID list specified by the user who uses the user terminal 21 (step S11). The input authority ID list includes an authority ID to identify the authority capable of decrypting and viewing the data specified by the user, for example.

The user terminal 21 sends the input data and authority ID list to the key management apparatus 50 as a data-storing request (step S12).

The encryption unit 56 included in the key management apparatus 50 receives the data-storing request (the data and authority ID list) sent from the user terminal 21, through the transmitting/receiving unit 54.

The data key generation unit 561 included in the encryption unit 56 generates a data key for encrypting the received data (step S13). This data key is generated by using a random number generation unit, for example. The data key generated by the data key generation unit 561 is a common key for encrypting data or decrypting the encrypted data.

The encryption/decryption unit 564 encrypts the received data by using the data key generated by the data key generation unit 561 (step S14).

The encryption/decryption unit 564 acquires one authority ID included in the received list of authority IDs.

Then, the encryption/decryption unit 564 refers to the first list included in the list of authorities stored in the authority management database 52. The encryption/decryption unit 564 encrypts the data key used for encrypting the received data, by using the authority public key identified by the authority public key ID associated with the acquired authority ID (step S15).

The encryption unit 56 stores the data (encrypted data) and data key (an encrypted data key) encrypted by the encryption/decryption unit 564 in the data management database 53 (step S16). The encryption unit 56 stores the data information about the encrypted data in the data management database 53.

When the received authority ID list includes two or more authority IDs, the above steps S15 and S16 are executed for all of the authority IDs.

Next, an explanation will be given on the first process of decrypting encrypted data in the key management system by referring to the sequence chart of FIG. 7. The first decryption process is a process when a user using the user terminal 21 decrypts and views encrypted data by using the user's own authority. In the following description, the user using the user terminal 21 is assumed as a user A, and the authority held by the user A is assumed as authority A.

First, the user terminal 21 acquires a user ID to identify the user A according to the operation of the user A who uses the user terminal 21 (step S21). This user ID may be previously held by the user terminal 21, or may be input by the user A upon execution of the first decryption process. The user terminal 21 acquires (inputs) a first decryption request for executing the first decryption process specified by the user A.

Then, the user terminal 21 sends the acquired user ID to the key management apparatus 50 (step S22). The user terminal 21 sends the acquired first decryption request to the key management apparatus 50.

Receiving the first decryption request from the user terminal 21, the key management apparatus 50 executes the first decryption process as follows.

The encryption unit 56 included in the key management apparatus 50 receives the user ID sent from the user terminal 21, through the transmitting/receiving unit 54. The encryption unit 56 refers to a second list included in the list of authorities stored in the authority management database 52, and specifies the authority A given to the user A identified by the received user ID.

The encryption unit 56 acquires a list of data IDs including a data ID to identify the data (encrypted data) which can be viewed (decrypted) by using the specified authority A, based on the data information stored in the data management database 53 (step S23). This data ID list may include a file name of the data identified by the data ID. This file name of the data is included in the data information stored in the data management database 53.

The encryption unit 56 sends the acquired data ID list to the user terminal 21 through the transmitting/receiving unit 54 (step S24).

The user terminal 21 receives the data ID list sent from the key management apparatus 50 (the transmitting/receiving unit 54). The user terminal 21 specifies a data ID in the received data ID list, according to the operation of the user terminal 21 by the user A, for example (step S25). By this operation, the data to be decrypted by the first decryption process is specified. In the following description, the data ID specified here is assumed as a specified data ID.

The user terminal 21 sends the specified data ID to the key management apparatus 50 (step S26).

The encryption unit 56 receives the specified data ID sent from the user terminal 21, through the transmitting/receiving unit 54. The encryption unit 56 specifies an encrypted authority private key ID, which is included in the second list of the list of authorities in association with the authority ID to identify the authority A given to the user A. The encryption unit 56 acquires the encrypted authority private key identified by the specified encrypted authority private key ID from the authority management database 52 (step S27). This encrypted authority private key is encrypted from an authority private key specific to the authority A, by using a user public key specific to the user A stored in the user management database 51.

The encryption unit 56 sends the acquired encrypted authority private key to the user terminal 21 through the transmitting/receiving unit 54 (step S28).

The user terminal 21 receives the encrypted authority private key sent from the key management apparatus 50. The user terminal 21 decrypts the received encrypted authority private key by using the user private key stored in the user terminal 21 (step S29). This user private key is a private key specific to the user A, and is paired with the user public key used for encryption of the encrypted authority private key.

The user terminal 21 sends the decrypted authority private key to the key management apparatus 50 (step S30).

The encryption unit 56 receives the authority private key sent from the user terminal 21, through the transmitting/receiving unit 54.

The encryption unit 56 specifies the encrypted data key ID associated with the specified data ID, based on the data information stored in the data management database 53. The encryption unit 56 acquires an encrypted data key from the data management database 53, according to the specified encrypted data key ID. This encrypted data key is obtained by encrypting the data key used for encryption of the data identified by the specified data ID, by using an authority public key specific to the authority A.

The encryption/decryption unit 564 included in the encryption unit 56 decrypts the acquired encrypted data key by using the received authority private key (step S31).

The encryption/decryption unit 564 decrypts the encrypted data stored in the data management database 53 in association with the specified data ID, by using the decrypted data key (step S32).

The encryption unit 56 sends the data decrypted by the encryption/decryption unit 564 to the user terminal 21 through the transmitting/receiving unit 54 (step S33).

The user terminal 21 receives the data sent from the key management apparatus 50. The user terminal 21 displays (outputs) the received data for the user A, for example.

Next, an explanation will be given on a second process of decrypting encrypted data in the key management system, by referring to the sequence chart of FIG. 8. The second decryption process is a process to be executed when the user A having the authority A to manage authority X in a shared manner decodes and views viewable data by using the authority of the authority X.

Here, the authorities A and B are assumed to be included in the authorities to manage the authority X in a shared manner. A user having the authority A is assumed as a user A, and a user terminal used by the user A is assumed as a user terminal 21. A user having the authority B is assumed as a user B, and a user terminal used by the user B is assumed as a user terminal 22. Hereinafter, the user terminals 21 and 22 will be explained. For the user terminals used by users having authorities other than the authorities A and B among the authorities to manage the authority X in a shared manner, the same operations as the operation of the user terminal 22 are assumed to be performed.

First, the user terminal 21 acquires a user ID to identify the user A, according to the operation of the user A using the user terminal 21 (step S41). The user terminal 21 acquires (inputs) a second decryption request for executing a second decryption process specified by the user A, for example.

Then, the user terminal 21 sends the acquired user ID to the key management apparatus 50 (step S42). The user terminal 21 sends the acquired second decryption request to the key management apparatus 50.

Receiving the second decryption request from the user terminal 21, the key management apparatus 50 executes the second decryption process as follows.

The encryption unit 56 included in the key management apparatus 50 receives the user ID sent from the user terminal 21, through the transmitting/receiving unit 54. The encryption unit 56 refers to the second list included in the list of authorities stored in the database 52, and specifies the authority A given to the user A identified by the received user ID.

The encryption unit 56 refers to the third list included in the list of authorities stored in the authority management database 52, and specifies the authority to be managed by the specified authority A in a shared manner (step S43). Namely, the encryption unit 56 specifies the authority identified by the authority ID included in the third list in association with the shared authority ID to identity the authority A. Here, the authority X is assumed to be specified.

Further, the encryption unit 56 refers to the third list of the list of authorities, and specifies authorities other than the authority A to manage the specified authority X in a shared manner. Namely, the encryption unit specifies the authorities (other than the authority A) identified by the shared authority ID included in the third list in association with the authority ID to identify the authority A. In this case, the specified authorities include the authority B, for example.

The encryption unit 56 acquires a list of data IDs including a data ID to identify data which can be viewed (decrypted) by using the specified authority X, based on the data information stored in the data management database 53 (step S44). This list of data IDs may include a file name of data identified by a data ID, as in the first decryption process shared hereinbefore.

The encryption unit 56 sends the acquired data ID list to the user terminal 21 through the transmitting/receiving unit 54 (step S45).

The user terminal 21 receives the data ID list sent from the key management apparatus 50. The user terminal 21 specifies a data ID from the received data ID list, according to the operation of the user terminal 21 by the user A, for example (step S46). By this operation, the data to be decrypted by the second decryption process is specified. In the following description, the data ID specified here is assumed as a specified data ID.

The user terminal 21 sends a specified data ID to the key management apparatus 50 (step S47).

The encryption unit 56 receives the specified data ID sent from the user terminal 21, through the transmitting/receiving unit 54.

The encryption unit 56 refers to the second list included in the list of authorities stored in the authority management database 52, and specifies an encrypted authority private key ID associated with the authority ID to identify the authority A given to the user A. The encryption unit 56 acquires the encrypted authority private key identified by the specified encrypted authority private key ID, from the authority management database 52 (step S48). The acquired encrypted authority private key (hereinafter, referred to as an encrypted authority private key A) is encrypted from an authority private key specific to the authority A, by using a user public key specific to the user A stored in the user management database 51.

Further, the encryption unit 56 refers to the second list included in the list of authorities stored in the authority management database 52, and specifies an encrypted authority private key ID associated with the authority ID to identify the authority B given to the user B. The encryption unit 56 acquires the encrypted authority private key identified by the specified encrypted authority private key ID, from the authority management database 52 (step S48). The acquired encrypted authority private key (hereinafter, referred to as an encrypted authority private key B) is encrypted from an authority private key specific to the authority B, by using a user public key specific to the user B stored in the user management database 51.

The encryption unit 56 sends the acquired encrypted authority private key A to the user terminal 21 through the transmitting/receiving unit 54 (step S49).

The user terminal 21 receives the encrypted authority private key A sent from the key management apparatus 50. The user terminal 21 decrypts the received encrypted authority private key A by using a user private key stored in the user terminal 21 (step S50). This user private key is a private key specific to the user A, and is paired with the user public key used for encryption of the encrypted authority private key. The user terminal 21 sends the decrypted authority private key (hereinafter, referred to as an authority private key A) to the key management apparatus 50 (step S51).

In contrast, the encryption unit 56 sends the acquired encrypted authority private key B to the user terminal 22 through the transmitting/receiving unit 54 (step S52).

The user terminal 22 receives the encrypted authority private key B sent from the key management apparatus 50. The user terminal 22 decrypts the received encrypted authority private key B, by using the user private key stored in the user terminal 22 (step S53). This user private key is a private key specific to the user B, and is paired with the user public key used for encryption of the encrypted authority private key. The user terminal 22 sends the decrypted authority private key (hereinafter, referred to as an authority private key B) to the key management apparatus 50 (step S54).

The encryption unit 56 receives the authority private key A and authority private key B sent from the user terminal 21 and user terminal 22, respectively, through the transmitting/receiving unit 54.

The encryption unit 56 refers to the third list included in the list of authorities stored in the authority management database 52, and specifies an authority ID to identify the authority X and an encrypted shared key ID associated with a shared authority ID to identify the authority A to manage the authority X in a shared manner. The encryption unit 56 acquires an encrypted shared key identified by the specified encrypted shared key ID, from the authority management database 52. This acquired encrypted shared key (hereinafter, referred to as an encrypted shared key A) is obtained by encrypting a shared key that is shared in secret from an authority private key specific to the authority X by the secret sharing unit 563 included in the encryption unit 56, by using an authority public key specific to the authority A.

The encryption/decryption unit 564 included in the encryption unit 56 decrypts the acquired encrypted shared key A by using the authority private key A received by the encryption unit 56. Therefore, the encryption unit 56 acquires a decrypted shared key (hereinafter, referred to as a shared key A).

In contrast, the encryption unit 56 refers to the third list included in the list of authorities stored in the authority management database 52, and specifies an authority ID to identify the authority X and an encrypted shared key ID associated with a shared authority ID to identify the authority B to manage the authority X in a shared manner. The encryption unit 56 acquires an encrypted shared key identified by the specified encrypted shared key ID, from the authority management database 52. This acquired encrypted shared key (hereinafter, referred to as an encrypted shared key B) is obtained by encrypting a shared key that is shared in secret from an authority private key specific to the authority X by the secret sharing unit 563, by using an authority public key specific to the authority B.

The encryption/decryption unit 564 included in the encryption unit 56 decrypts the acquired encrypted shared key B by using the authority private key B received by the encryption unit 56. Therefore, the encryption unit 56 acquires a decrypted shared key (hereinafter, referred to as a shared key B).

The secret sharing unit 563 included in the encryption unit 56 obtains an authority private key specific to the authority X (hereinafter, referred to as an authority private key X), from the shared key A and shared key B acquired by the encryption unit 56 (step S55).

Here, the authority private key X is assumed to be obtainable by using two or more shared keys. In this case, even if a decrypted authority private key B is not sent from the user terminal 22, for example, it is possible to obtain the authority private key X when a decrypted authority private key is sent from a user terminal used by a user having a shared authority (authority to manage the authority X in a shared manner) other than the user terminal 22.

The encryption unit 56 specifies an encrypted data key ID associated with the specified data ID, based on the data information stored in the data management database 53. The encryption unit 56 acquires an encrypted data key identified by the specified encrypted data key ID from the data management database 53. This encrypted data key is encrypted from a data key used for encryption of the data identified by the specified data ID, by using an authority public key specific to the authority X.

The encryption/decryption unit 564 decrypts the acquired encrypted data key by using the obtained authority private key X (step S56).

The encryption/decryption unit 564 decrypts the encrypted data stored in the data management database 53 in association with the specified data ID, by using the decrypted data key (step S57).

The encryption unit 56 sends the data decrypted by the encryption/decryption unit 564, to the user terminal 21 through the transmitting/receiving unit 54 (step S58).

The user terminal 21 receives the data sent from the key management apparatus 50. The user terminal 21 displays (outputs) the received data to the user A, for example (step S59).

The above explanation is given on the case that the encrypted data specified by the user A having the authority A to manage the authority X in a shared manner. It is allowed to decrypt the encrypted data specified by a user C not having the authority to manage the authority X in a shared manner. In this case, when a second decryption request is received from a user terminal used by the user C, the key management apparatus 50 returns all data ID lists to that user terminal. Therefore, even if the user C does not have the authority to manage the authority X in a shared manner, the user C can specify encrypted data viewable by using the authority X. Thereafter, by the above described operations of the key management apparatus 50 and user terminals 21 and 22, encrypted data viewable by using the authority X can be decrypted.

Figure 9:
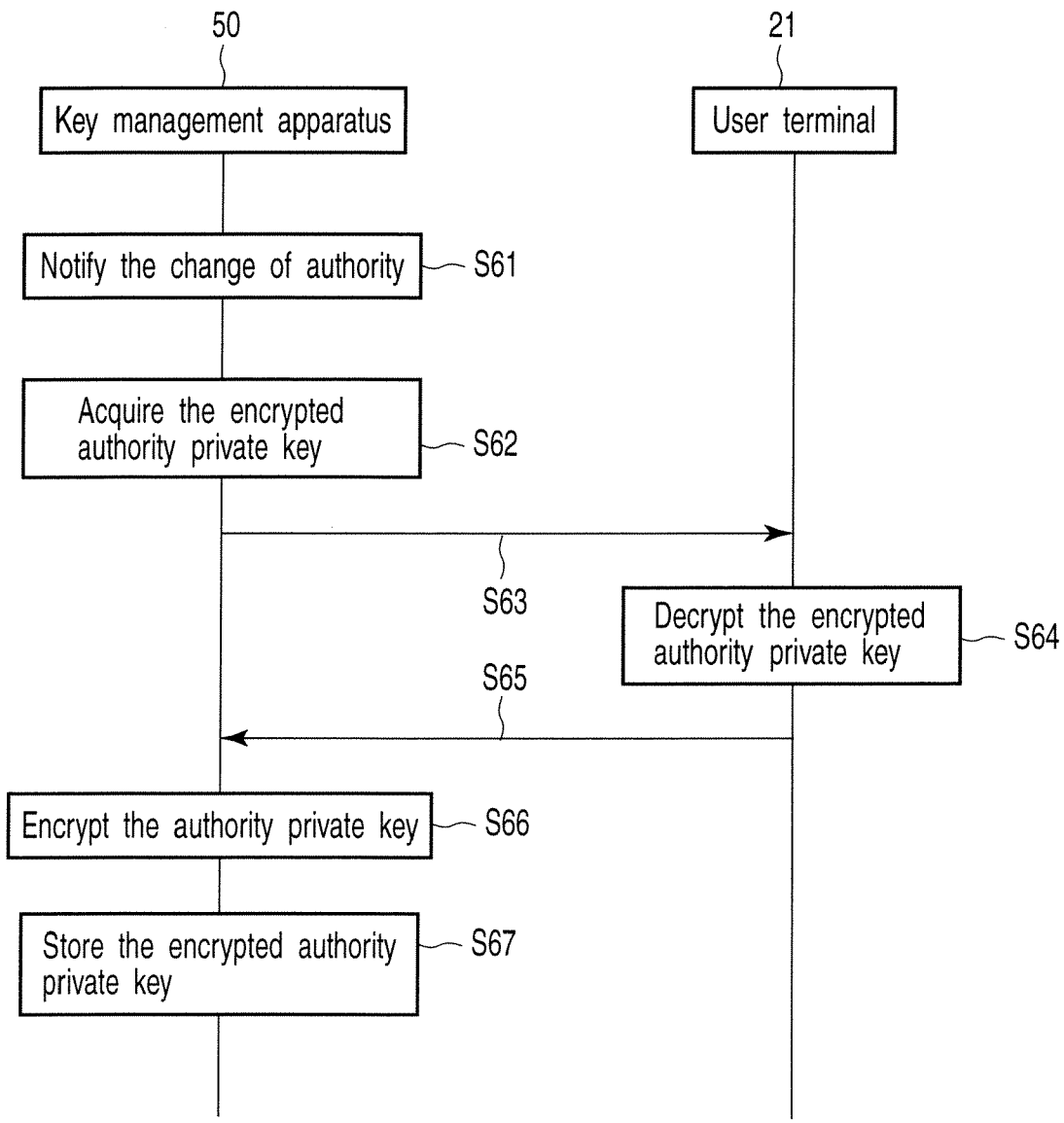
FIG. 9 is a sequence chart showing procedural steps when authority is changed, in the key management system.

Next, an explanation will be given on processing steps of the key management system, when the authority A given to the user A using the user terminal 21 is changed (given) to the user B different from the user A, by referring to the sequence chart of FIG. 9.

First, the authority change notification unit 57 of the key management apparatus 50 notifies the encryption unit 56 that the authority A is changed from the user A to the user B, according to the operation by the administrator of the key management apparatus 50, for example (step S61).

The encryption unit 56 included in the key management apparatus 50 receives the notice from the authority change notification unit 57. According to the notice from the authority change notification unit 57, the encryption unit 56 specifies an encrypted authority private key ID. The encryption unit 56 refers to the second list included in the list of authorities stored in the authority management database 52, and specifies an authority ID to identify the changed authority (here, the authority A) and an encrypted authority private key ID associated with the received user ID. The encryption unit 56 acquires an encrypted authority private key identified by the specified encrypted authority private key ID (step S62). The acquired encrypted authority private key is sent to the user terminal 21 (step S63).

The user terminal 21 decrypts the encrypted authority private key received from the key management apparatus 50. The user terminal decrypts the received encrypted authority private key, by using the user private key stored in the user terminal 21 (step S64). The user terminal 21 sends the decrypted authority private key to the key management apparatus 50 (step S65).

The encryption unit 56 receives the authority private key sent from the user terminal 21, through the transmitting/receiving unit 54. The encryption/decryption unit 564 encrypts the received authority private key by using the user public key (the user public key specific to the user B) stored in the user management database 51 in association with user information to indicate the user B who is newly given the authority A (step S66).

The encryption unit 56 stores the authority private key (the encrypted authority private key) encrypted by the encryption/decryption unit 564 in the authority management database 52 (step S67). At this time, the encryption unit 56 updates the list of authorities (the second list included in the list of authorities) stored in the authority management database 52, according to the change of the authority A from the user A to user B. An encrypted authority private key (i.e., an encrypted authority private key before the change) encrypted by a user public key specific to the user A is eliminated from the authority management database 52.

Figure 10:
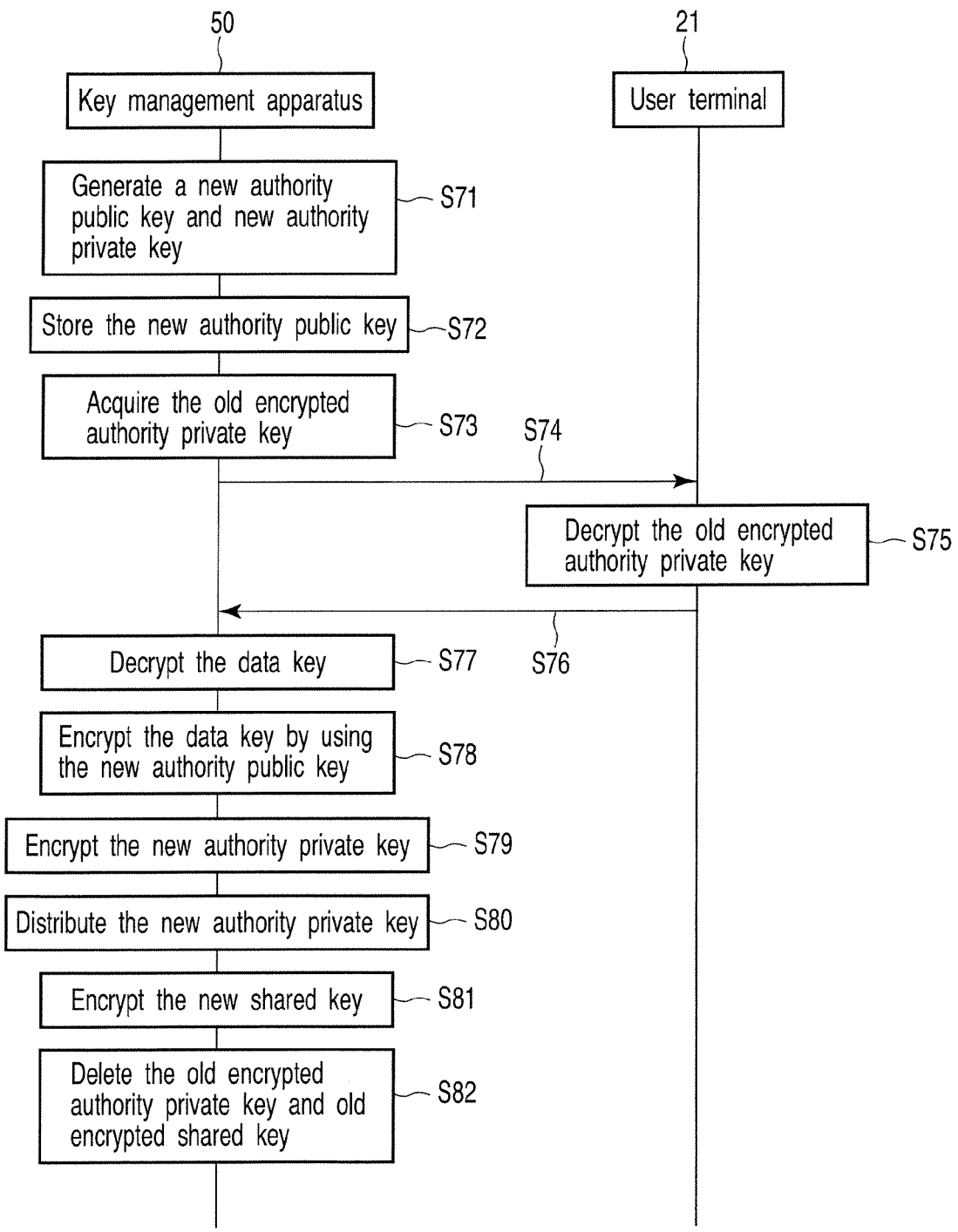
FIG. 10 is a sequence chart showing procedural steps when an authority key is changed, in the key management system.

Next, an explanation will be given on processing steps of the key management system, when the safety of authority keys (an authority public key and an authority private key) is lowered and the authority keys are changed, by referring to the sequence chart of FIG. 10. An authority public key and authority private key before the change are called an old authority public key and old authority private key. An authority public key and authority private key after the change are called a new authority public key and new authority private key.

In the following description, the authority whose authority key is to be changed is assumed as authority A. A user having the authority A is assumed as a user A, and a user terminal used by the user A is assumed as a user terminal 21.

First, the key update unit 55 of the key management apparatus 50 notifies the encryption unit 56 that an authority key specified as necessary by an administrator of the key management apparatus 50 is updated (changed). In this case, when the safety of an authority key is lowered as described above, the administrator specifies that authority key as an authority key to be changed.

The authority key generation unit 562 included in the encryption unit 56 newly generates an authority public key and authority private key, according to the information from the key update unit 55 (step S71). The authority key generation unit 562 newly generates an authority public key and authority private key by using random numbers, for example.

Then, the encryption unit 56 replaces the old authority public key by the new authority public key generated by the authority key generation unit 562, and sores it in the authority management database 52 (step S72). At this time, the old public key is eliminated.

The encryption unit 56 refers to the second list included in the list of authorities stored in the authority management database 52, and specifies an encrypted authority private key ID associated with an authority ID to identify the authority A. The encryption unit 56 acquires the old encrypted authority private key identified by the specified encrypted authority private key ID, from the authority management database 52 (step S73). The encryption unit 56 sends the acquired old encrypted authority private key to the user terminal 21 through the transmitting/receiving unit 54 (step S74).

The user terminal 21 receives the old encrypted authority private key sent from the key management apparatus 50. The user terminal 21 decrypts the received old encrypted authority private key, by using the user private key stored in the user terminal 21 (step S75).

The user terminal 21 sends the decrypted old authority private key to the key management apparatus 50 (step S76).

The encryption unit 56 receives the old authority private key sent from the user terminal 21, through the transmitting/receiving unit 54. The encryption unit 56 specifies an encrypted data key ID associated with the authority ID (decrypted authority ID) to identify the authority A. The encryption unit 56 acquires the encrypted data key identified by the specified encrypted data key ID, from the data management database 53.

The encryption/decryption unit 56 decrypts the acquired encrypted data key, by using the received old authority private key (step S77).

The encryption/decryption unit 56 encrypts the decrypted data key, by using the new authority public key stored in the authority management database 52 (step S78). The data key encrypted by the encryption/decryption unit 56 is stored in the data management database 53.

Then, the encryption unit 56 acquires a user public key (a user public key specific to the user A) stored in the user management database 51 in association with user information to indicate a user having the authority A (here, the user A).

The encryption/decryption unit 564 encrypts the new authority private key generated by the authority key generation unit 562, by using the acquired user public key (step S79). The new authority private key encrypted by the encryption/decryption unit 564 is stored in the authority management database 52.

The secret sharing unit 563 shares the new authority private key generated by the authority key generation unit 562, into two or more shared keys (step S80). At this time, the secret sharing unit 563 shares the new authority private key into shared keys of the same number as the authorities to manage the authority A in a shared manner (the shared authority IDs associated with the authority ID to identity the authority A).

The encryption unit 56 refers to the third list included in the list of authorities stored in the authority management database 52, and specifies a shared authority ID associated with the authority A. Further, the encryption unit 56 refers to the first list included in the list of authorities, and specifies an authority public key ID associated with the authority ID to identify the authority identified by the specified shared authority ID. The authority public key identified by the specified authority public key ID is an authority public key specific to the authority identified by the shared authority ID.

The encryption/decryption unit 564 encrypts the shared key (new shared key) shared in secret by the secret sharing unit 563, by using the authority public key identified by the specified authority public key ID (step S81). The new shared key encrypted by the encryption/decryption unit 564 is stored in the authority management database 52.

The encryption unit 56 eliminates the old encrypted authority private key and old encrypted shared key stored in the authority management database 52.

In the above description, the authority private key specific to the authority A is acquired by decrypting the old encrypted authority private key identified by the encrypted authority private key ID associated with the authority ID to identify the authority A. It is allowed to obtain the authority private key by using the shared keys shared in secret from the authority private key, as shown in the chart shown in FIG. 8.

Figure 11:
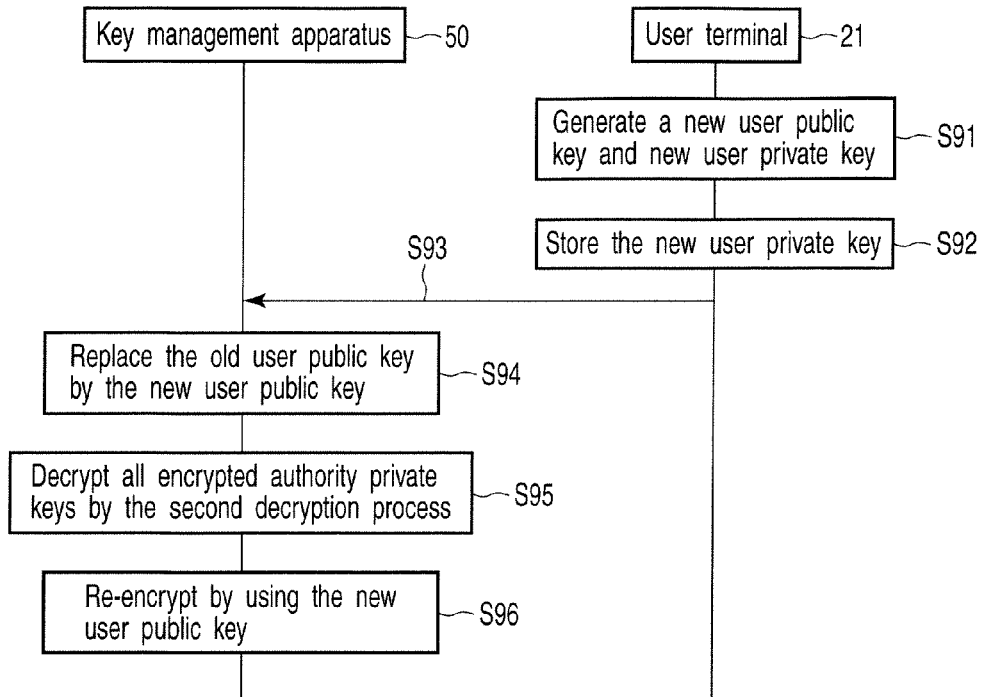
FIG. 11 is a sequence chart showing procedural steps when a user private key is lost, in the key management system.

Next, an explanation will be given on processing steps of the key management system, when the user A using the user terminal 21 loses a user private key specific to the user A, by referring to the sequence chart of FIG. 11. A lost user private key and a user public key paired with the user private key are assumed as an old user private key and an old user public key, respectively.

First, the user terminal 21 (a user key generation unit included in the user terminal 21) newly generates a user public key and user private key by using random numbers (step S91). Hereinafter, a new user public key and new user private key generated by the user terminal 21 are called a new user public key and new user private key.

Then, the user terminal 21 stores a generated new user private key in a database included in the user terminal 21, and manages it in secret (step S92).

The user terminal 21 sends the generated new user public key to the key management apparatus 50 (step S93).

The encryption unit 56 receives the new user public key sent from the user terminal 21, through the transmitting/receiving unit 54. The encryption unit 56 replaces the old user public key stored in the user management database 51 by the received new user public key, and stores the new user public key (step S94).

Then, the encryption unit 56 decrypts the encrypted authority private key identified by the encrypted authority private key ID associated with the authority ID to identify the authority held by the user A, by the second decryption process described hereinbefore (step S95). The encryption unit 56 refers to the list of authorities stored in the authority management database, and executes the decryption process.

Figure 8:
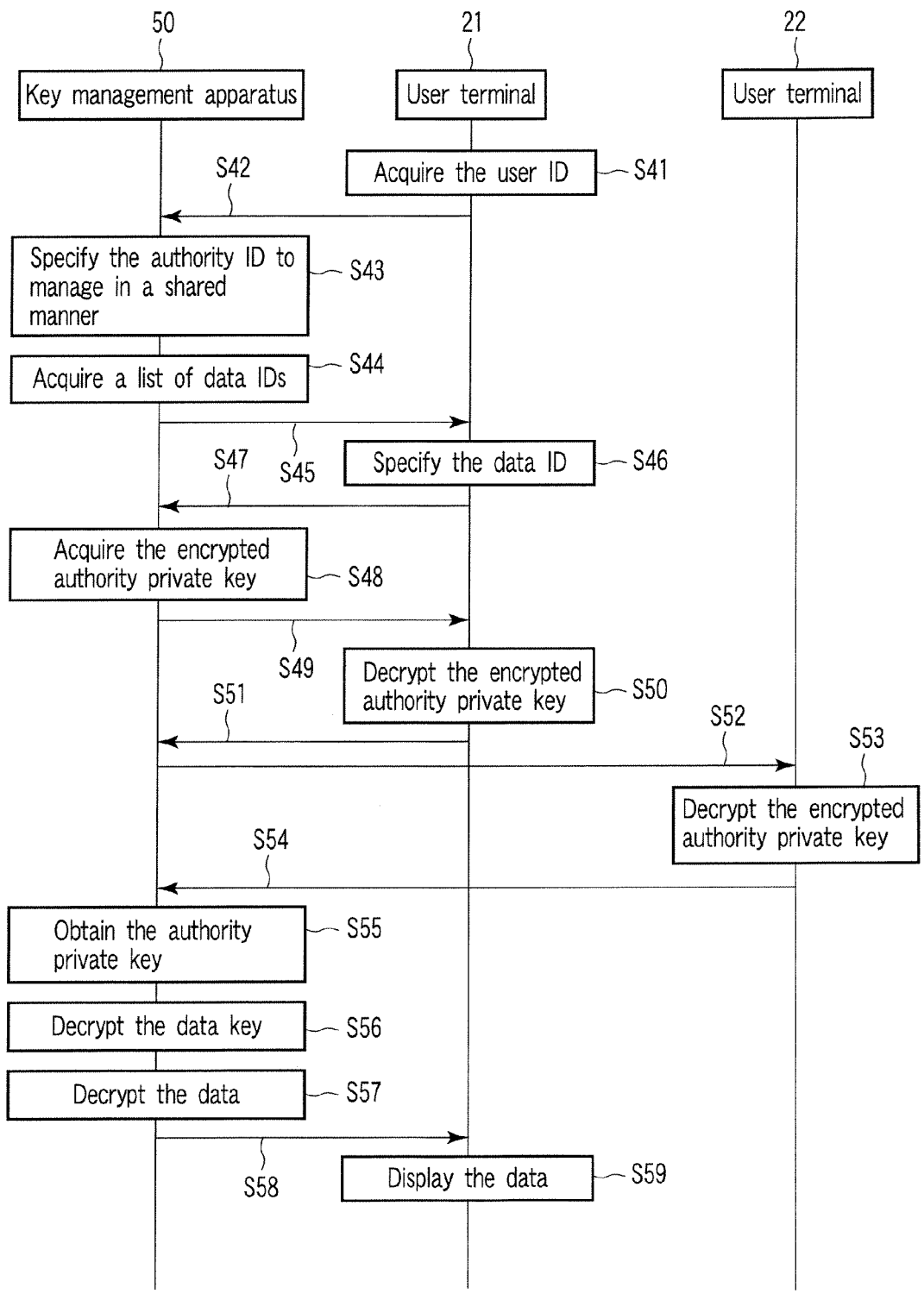
FIG. 8 is a sequence chart showing procedural steps of a second process of decrypting encrypted data in the key management system.

Here, the second decryption process indicates steps S48-S55 shown in FIG. 8. When the number of authorities held by the user A exists is two or more, step S95 is executed for all of them.

The encryption/decryption unit 564 re-encrypts the decrypted authority private key by using the new user public key stored in the user management database 51 (step S96). The authority private key (encrypted authority private key) re-encrypted by the encryption/decryption unit 564 is stored in the authority management database 52.

After the above process, the data associated with the old user private key and old user public key (e.g., the authority private key, etc. encrypted by using the old user public key) are eliminated.

Figure 12:
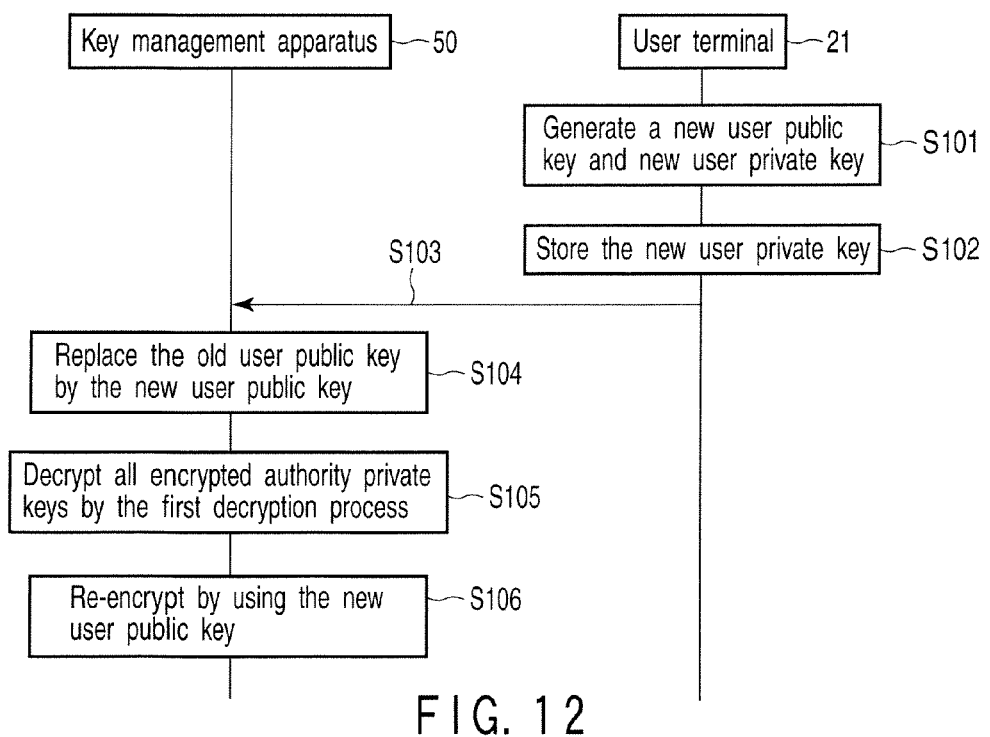
FIG. 12 is a sequence chart showing procedural steps when a user key is changed, in the key management system.

Next, an explanation will be given on processing steps of the key management system, when a user key (a user public key and a user private key) specific to the user A using the user terminal 21 is changed because of expiration of term, by referring to the sequence chart of FIG. 12. A user public key and user private key before the change are called an old user public key and old user private key. A user public key and user private key after the change are called a new user public key and new user private key.

First, the user terminal 21 newly generates a new user public key and new user private key by using random numbers, for example (step S101).

Then, the user terminal 21 stores the generated new user private key in a database included in the user terminal 21, and manages it in secret (step S102).

The user terminal 21 sends the generated new user public key to the key management apparatus 50 (step S103).

The encryption unit 56 receives the new user public key sent from the user terminal 21, through the transmitting/receiving unit 54. The encryption unit 56 replaces the old user public key stored in the user management database 51 by the received new user public key, and stores the new user public key (step S104).

Then, the encryption unit 56 decrypts the encrypted authority private key identified by the encrypted authority private key ID associated with the authority ID to identify the authority held by the user A, by the first decryption process described hereinbefore (step S105). The encryption unit 56 refers to the list of authorities stored in the authority management database 52, and executes the decryption process.

Figure 7:
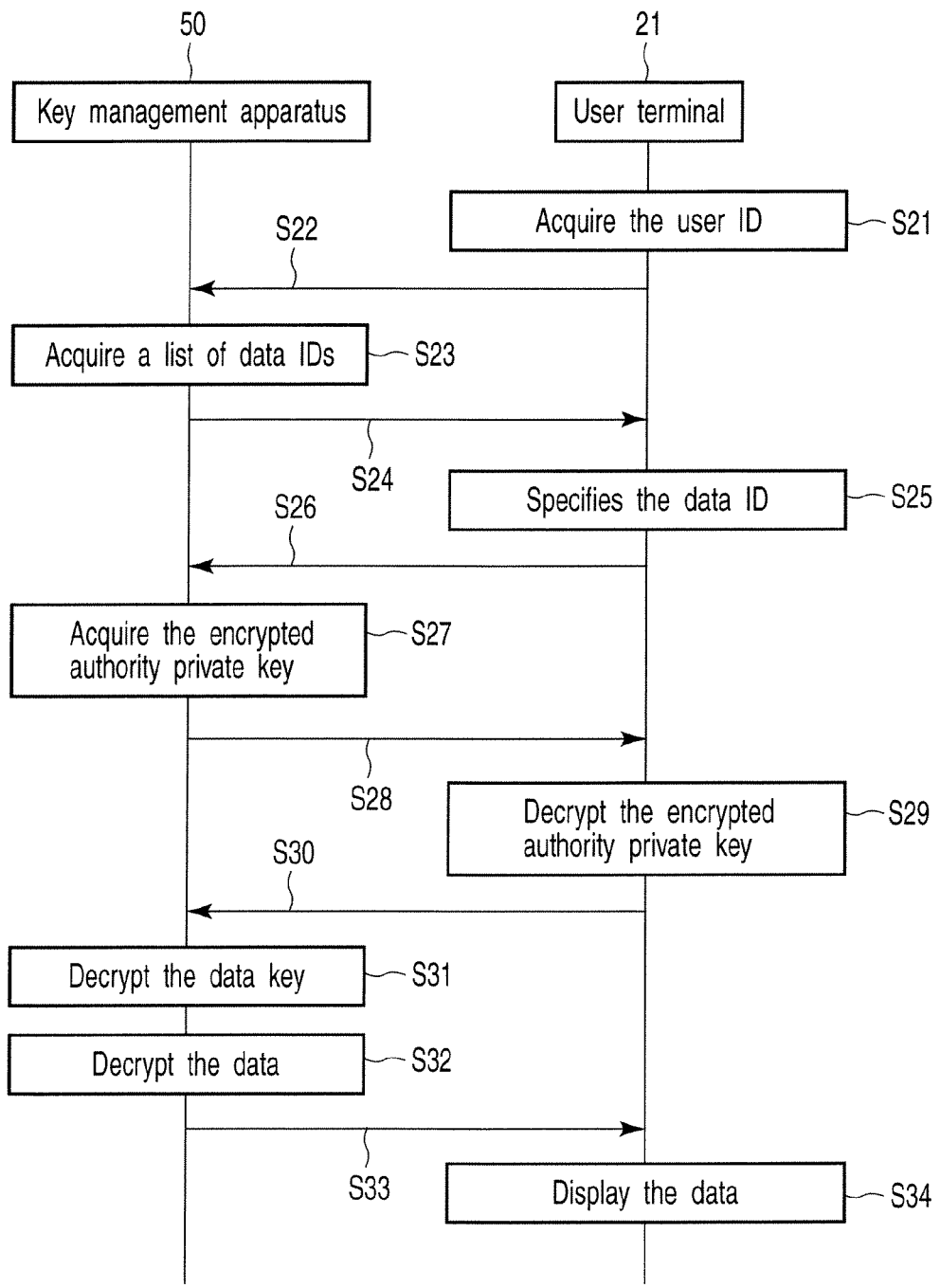
FIG. 7 is a sequence chart showing procedural steps of a first process of decrypting encrypted data in the key management system.

Here, the first decryption process indicates steps S27-S30 shown in FIG. 7. When the number of authorities held by the user A is two or more, step S105 is executed for all of them.

The encryption/decryption unit 564 re-encrypts the decrypted authority private key by using the new user public key stored in the user management database 51 (step S106). The authority private key (encrypted authority private key) re-encrypted by the encryption/decryption unit 564 is stored in the authority management database 52.

After the above process, the data associated with the old user private key and old user public key (e.g., the authority private key, etc. encrypted by using the old user public key) is eliminated.

In the embodiment described herein, a data key used for encrypting data is managed by being encrypted by an authority public key specific to the authority capable of viewing that data. An authority private key specific to a certain authority is managed by being encrypted by a user public key specific to the user having that authority. A user private key specific to a certain user is managed within a user terminal used by that user. Therefore, even if a key (an authority key, or a user key) is lost, or authority is changed, it can be easily coped with out having to re-encrypting all the data. For example, if one user holds two or more posts (authorities) or a post is changed by personnel changes, etc., this can be dealt with merely by generating and encrypting a key within the key management system, without urging the user to take action.

Further, in the embodiment, an authority private key specific to authority is shared in secret, and shared keys are managed by being encrypted by an authority public key specific to each authority to manage that authority in a shared manner. Therefore, for example, even if a user having the authority A does not exist, the authority A can be used by gathering (by being approved by) the users having the right to manage the authority A in a shared manner.

Further, in the embodiment, as an authority key is appropriately managed in a shared manner, an administrator of the key management system is unnecessary, and an illegal action by an administrator can be prevented. Namely, as a supervisor having overall authority is unnecessary, the safety is improved.

As a public key system is used as an authority key specific to a certain authority, only a public key is required (a private key is unnecessary) when storing data, and an input operation by the user having that authority is not required. Further, even if a key (the data of a key) managed within the key management apparatus 50 is used, it is impossible to decrypt encrypted data without using a user private key. This also improves the safety.

In the description herein, a shared key is encrypted (at an authority level) by using an authority public key specific to the authority identified by a shared authority ID. It is allowed to encrypt (at a user level) a shared key by using a user public key of a user having an authority identified by a shared authority ID.

Further, in the description herein, a user having authority can decrypt data viewable by using that authority. This is not restrictive. For example, by using such authority, it is possible not only to decrypt encrypted data, but also to provide an electronic signature. Namely, an electronic signature is possible by gathering users having authorities to mange such authority in a shared manner.

What is to be encrypted (or signed) by an authority key is not limited in the embodiment. The embodiment is applicable to any system requiring an access control, even if it is used in cases other than in a file system.

The invention is not limited to the embodiment described herein, and may be embodied by modifying the constituent elements in implementation stages without departing from its spirits or essential characteristics. The invention may be embodied in various forms by appropriately combining the constituent elements disclosed in the embodiment described herein. For example, some elements may be deleted from the elements disclosed in the embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A key management system comprising:
   user terminals; and
   a key management apparatus connected to the user terminals,
   wherein each of the user terminals includes a first database to store a user private key specific to a user who uses the user terminal, and
   the key management apparatus includes a second database to store a user public key paired with the user private key stored in the first database and user information to indicate a user who uses a user terminal including the first database, by associating them with each other;
   a first encryption unit configured to encrypt an authority private key specific to a first authority given to at least one user among the users who use the user terminals, by using the user public key stored in the second database in association with user information to indicate a user given the first authority;
   a secret sharing unit configured to share in secret an authority private key specific to the first authority, into shared authority private keys;
   a second encryption unit configured to encrypt each of the shared authority private keys shared in secret, by using an authority public key specific to each of second authorities different from the first authority; and
   a third database which stores an authority private key encrypted by the first encryption unit and an authority public key paired with the authority private key, in association with the first authority, and stores shared authority private keys encrypted by the second encryption unit, in association with the second authorities.

2. The key management system according to claim 1, wherein each of the user terminals further includes a data transmission unit configured to transmit data specified by a user who uses the user terminal and authority information to indicate the first authority to manage the data, and
   the key management apparatus further includes a data key generation unit configured to generate a data key for encrypting the transmitted data and decrypting the encrypted data;
   a third encryption unit configured to encrypt the transmitted data by using the generated data key;
   a fourth encryption unit configured to encrypt the generated data key, by using an authority public key stored in the third database in association with the first authority indicated by the transmitted authority information; and
   a fourth database which stores data encrypted by the third encryption unit and a data key encrypted by the fourth encryption unit, in association with the first authority indicated by the transmitted authority information.

3. The key management system according to claim 2, wherein each of the user terminals further includes a user information acquisition unit, a data specification unit, a first decryption unit, and an output unit,
   the key management apparatus further includes a data information acquisition unit, an authority private key acquisition unit, a second decryption unit, and a third decryption unit,
   the user information acquisition unit acquires user information to indicate a user who uses the user terminal, according to the user's operation,
   the data information acquisition unit acquires a list of data information to indicate the encrypted data stored in the fourth database, in association with the first authority given to the user indicated by the acquired user information,
   the data specification unit specifies data information from the acquired list, according to the operation of the user terminal by the user who uses the user terminal,
   the authority private key acquisition unit acquires the encrypted authority private key stored in the third database in association with the first authority,
   the first decryption unit decrypts the acquired encrypted authority private key, by using a user private key stored in the first database included in the user terminal,
   the second decryption unit decrypts the encrypted data stored in the fourth database in association with the data indicated by the specified data information, by using the encrypted authority private key,
   the third decryption unit decrypts the encrypted data indicated by the specified data information, by using the decrypted data key, and
   the output unit outputs the decrypted data.

4. The key management system according to claim 2, wherein a first user terminal used by a first user given the second authorities, among the user terminals, further includes a user information acquisition unit, a data specification unit, a first decryption unit, and an output unit,
   a second user terminal used by a second user given second authorities different from the second authorities given to the first user, among the user terminals, further includes a second decryption unit, the key management apparatus further includes a specification unit, a data information acquisition unit, a first authority private key acquisition unit, a second authority private key acquisition unit, a decryption unit, a third decryption unit, and a fourth decryption unit, the third database further stores authority information indicating first authority information to indicate the first authority and second authority information to indicate the second authorities, the user information acquisition unit acquires user information to indicate the first user, according to the operation by the first user who uses the first user terminal, the specification unit specifies a first authority indicated by the first authority information included in the authority information, which includes the second authority information to indicate the second authorities given to the first user indicated by the acquired user information, the data information acquisition unit acquires a list of data information to indicate the encrypted data stored in the fourth database in association with the specified first authority, the data specification unit specifies data information from the acquired list, according to the operation of the first user terminal by the first user who uses the first user terminal, the first authority private key acquisition unit acquires the encrypted shared authority private key stored in the third database in association with the second authority given to the first user who uses the first user terminal, the second authority private key acquisition unit acquires the encrypted shared authority private key stored in the third database in association with the second authorities given to the second user who uses the second user terminal, the first decryption unit decrypts the encrypted shared authority private key acquired by the first authority private key acquisition unit, by using a user private key stored in the first database included in the first user terminal, the second decryption unit decrypts the encrypted shared authority private key acquired by the second authority private key acquisition unit, by using a user private key stored in the first database included in the second user terminal, the decryption unit decrypts an authority private key specific to the first authority, by using a shared authority private key decrypted by the first decryption unit and second decryption unit, the third decryption unit decrypts the encrypted data key stored in the fourth database in association with the encrypted data indicated by the specified data information, by using the decrypted authority private key, the fourth decryption database decrypts the encrypted data indicated by the specified data information, by using the decrypted data key, and the output unit outputs the decrypted data.

5. The key management system according to claim 1, wherein each of the user terminals further includes a decryption unit, the key management apparatus further includes a change notification unit, an authority private key acquisition unit, and a storing unit, the change notification unit notifies that a first authority given to a first user among the users is changed to a second user different from the first user, according to the operation of the key management apparatus by an administrator of the key management apparatus, the authority private key acquisition unit acquires the encrypted authority private key stored in the third database in association with the first authority changed from the first user to the second user, according to the notice from the change notification unit, the decryption unit decrypts the acquired encrypted authority private key, by using a user private key stored in the first database included in a user terminal used by the first user, the first encryption unit encrypts the decrypted authority private key, by using a user public key specific to the second user stored in the second database in association with user information to indicate the second user, and the storing unit stores an authority private key encrypted in the third database, in association with the first authority changed from the first user to the second user, by using a user public key specific to the second user.

6. The key management system according to claim 2, wherein each of the user terminals further includes a first decryption unit, the key management apparatus further includes an authority key update unit, an authority key generation unit, an authority private key acquisition unit, a second decryption unit, and a storing unit, the authority key update unit provides notification about updating of an authority public key and authority private key specific to the first authority, according to the operation of the key management apparatus by an administrator of the key management apparatus, the authority key generation unit generates a new authority public key and new authority private key specific to the first authority, according to the notice from the authority key update unit, the authority private key acquisition unit acquires the encrypted authority private key stored in the third database in association with the first authority, the first decryption unit decrypts the acquired encrypted authority private key, by using a user private key stored in the first database included in the user terminal, the second decryption unit decrypts the encrypted authority private key stored in the fourth database in association with the first authority, by using the decrypted authority private key, the fourth encryption unit encrypts the decrypted data key, by using the generated new authority public key, the first encryption unit encrypts the generated new authority private key, by using a user public key stored in the second database in association with user information to indicate a user given the first authority, the secret sharing unit shares in secret the generated new authority private key into shared authority private keys, the second encryption unit encrypts each of the shared authority private keys shared in secret from the new authority private key, by using an authority public key specific to each of the second authorities different from the first authority, and the storing unit stores a new authority private key in the third database in association with the first authority, stores shared authority private keys encrypted by the second encryption unit in the third database in association with the second authorities, and stores a data key encrypted by the fourth encryption unit in the fourth database in association with the first authority.

7. A key management apparatus connected to the user terminals including a first database to store a user private key specific to a user who uses the user terminal, comprising:

a second database to store a user public key paired with a user private key stored in the first database and user information to indicate a user who uses a user terminal including the first database, by associating them with each other;

a first encryption unit configured to encrypt an authority private key specific to a first authority given to at least one user among the users who use the user terminals, by using a user public key stored in the second database in association with user information to indicate a user given the first authority;

a secret sharing unit configured to share in secret an authority private key specific to the first authority, into shared authority private keys;

a second encryption unit configured to encrypt each of the shared authority private keys shared in secret, by using an authority public key specific to each of second authorities different from the first authority; and a third database which stores an authority private key encrypted by the first encryption unit and an authority public key paired with the authority private key, in association with the first authority, and stores shared authority private keys encrypted by the second encryption unit, in association with the second authorities.

8. A key management method executed by a key management system having user terminals used by users, and a key management apparatus connected to the user terminals, comprising:

storing a user private key specific to a user who uses the user terminal, in the first database included in each of the user terminals;

storing a user public key paired with a user private key stored in the first database and user information to indicate a user who uses a user terminal including the first database, in a second database, by associated them with each other;

encrypting an authority private key specific to a first authority given to each of the users, in association with user information to indicate a user given the first authority, by using a user public key stored in the second database;

sharing in secret an authority private key specific to the first authority into two or more shared authority private keys;

encrypting each of the shared authority private keys shared in secret, by using an authority public key specific to each of second authorities different from the first authority;

storing the encrypted authority private key and an authority public key paired with the authority private key, in a third database, in association with the first authority; and storing the encrypted shared private keys in the third database, in association with the second authorities.

* * * * *